July 27, 1943. W. J. MAY 2,325,260
BARRIER FOR ANTI-TANK AND LIKE PURPOSES
Filed Oct. 29, 1940
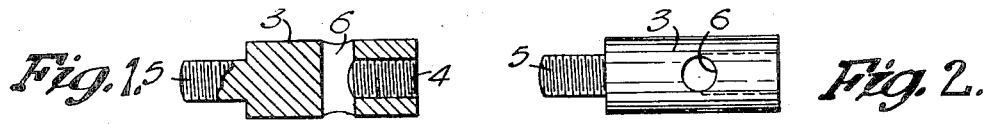
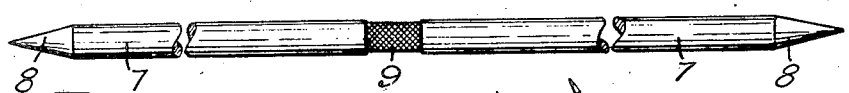
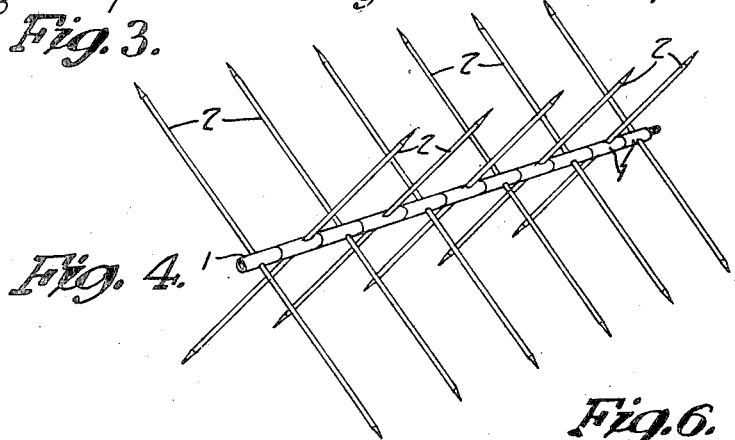
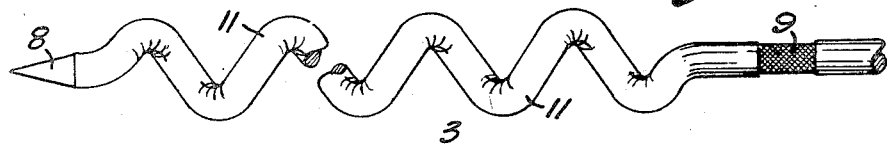
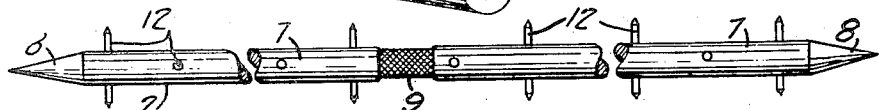
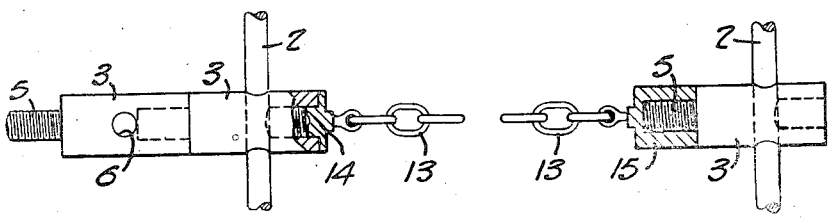
INVENTOR
W. J. MAY
PER
ATTORNEYS Patented July 27, 1943

2,325,260

UNITED STATES PATENT OFFICE 2,325,260

BARRIER FOR ANTITANK AND LIKE PURPOSES

William James May, Farnborough, England

Application October 29, 1940, Serial No. 363,385
In Great Britain November 20, 1939

3 Claims. (Cl. 256—1)

This invention relates to barriers for military and like work and has for its object to provide a barrier which can be readily assembled from lengths which when disassembled can be accommodated in a compact space. Another object of this invention is to provide a barrier which is easily disassembled and when erected for use can cover a large area and afford the maximum obstruction for the minimum quantity of material. A still further object of this invention is to provide a barrier which is easily portable, so that it can be transferred quickly to various positions without damage and loss of parts and without the necessity of special tools.

In carrying one form of this invention into practice steel rods with pointed ends are provided, each rod conveniently being about six feet long although other dimensions may be employed. The rods are sufficiently thick so as not to bend easily and they are preferably of circular section. The obstruction comprises a large number of these rods arranged in an intersecting manner preferably at right angles to each other.

The means for connecting the rods is of a nature which can be repeatedly used and is readily assembled, and when in use rigidly locks the assembly of rods so that they will remain locked together when an obstruction comes into contact with them. The coupling means comprises a plurality of metal bushes of circular or other suitable cross section, and in the end of one bush is tapped a screw hole, the other end having a concentric extension threaded to screw into the threaded hole of the adjacent bush. Each bush has passed through it preferably diametrically a hole adapted to receive one of the rods, and this hole is so located that part of the rod will be exposed to contact with a bush which is theaded into or onto the bush receiving the rod.

Each rod is preferably formed with a reduced diameter part midway between its ends, such reduced diameter part being threaded or serrated to present a surface to the appropriate bush which will rigidly lock the rod in position.

In order that this invention may be clearly understood and readily carried into effect a drawing is appended hereto illustrating embodiments thereof and wherein—

Figs. 1 and 2 are sectional elevation and outside plan views respectively of one of the bushes.

Fig. 3 is a broken plan view of one of the rods.

Fig. 4 is a perspective view showing the elements assembled to form a length of obstructing barrier.

Fig. 5 is a perspective view of a modified form of bush.

Fig. 6 is a perspective view of a rod of spiral form which can be used with the modified form of bush shown in Fig. 5.

Fig. 7 is a perspective view of a rod with lateral spikes which also can be used with the said modified bush, and Fig. 8 is a view showing a method of introducing flexibility in the barrier.

Referring to the drawing it will be seen by reference to Fig. 4 that the assembled elements form an obstruction in the form of a centre post 1 and a plurality of rods 2 arranged in intersecting planes and carried by the common centre post 1.

The obstruction can be assembled to any desired length so the centre post comprises a plurality of readily connectable and disconnectable metal bushes of cylindrical or other suitable cross section. Each such bush comprises, as shown in Fig. 1, a solid metal body 3 with an axially threaded bore 4 in one end, and a screw threaded concentric extension 5 at the other end dimensioned to screw home into a bore 4 of another bush so that a plurality of bushes can be assembled in a rigid rod-like manner.

Forming the inner terminus of the axial bore 4 is a diametrically disposed hole 6 which receives one of a plurality of stout metal rods 7. Each rod 7 can be about six feet long and is provided with pointed ends 8, and the rods are sufficiently thick to withstand considerable bending stresses. The rods 7 are locked in the bushes 3 by the relatively transverse pressure of the free ends of the threaded extensions 5 which abut against the median parts of the rods 7.

To afford adequate binding of the free ends of the threaded extensions against the rods 7, the median parts of the rods 7 are each formed with a reduced diameter part 9 which is threaded or serrated as shown to bite against the end of the appropriate threaded extension 5 and against the opposed abutting face of the bush, or if desired the median parts of the rods can be recessed to receive pointed ends of the threaded extensions 5.

Instead of passing the rods 7 through diametrical holes in the bushes, diametrical slots 10 can, as shown in Fig. 5, be provided in the bushes, each slot opening into one end of each bush, whereby the rods 7 may be inserted in the bushes in the axial direction of the bushes, this facilitating and speeding up the assembly, and also enabling the free ends of the rods to have any desired configuration such as, e. g., of spiral as shown at 11 in Fig. 6, or zig-zag form, or provided with lateral spikes 12 as shown in Fig. 7.

To afford some flexibility in the obstruction some of the bushes can be connected together by links or cables 13 as shown in Fig. 8, such an arrangement enhancing the possibility of the obstruction becoming entangled with tanks and other vehicles. These links can be connected to the bushes by threaded plugs 14 and caps 15 provided with eyes to form link elements. Also the reduced diameter portions 9 of the rods may be longer axially than the portions of the bushes that receive them, thereby affording play to make up for irregularities on the ground.

It will be apparent from the foregoing that obstructions of considerable length and area can be laid so as to form entanglements which would be effective against advancing or retreating tanks. The various parts are not liable to be damaged, and if desired the rods may be adapted to receive barbed wire or other supplementary entanglements.

I claim:

1. A barrier for anti-tank and similar purposes comprising a metal pole-like core composed of a plurality of metal bushes threaded together in series and a plurality of metal rods affixed between their ends to said bushes and arranged in intersecting directions, said bushes being formed with co-axial threaded bores and externally threaded extensions at their opposed ends and also with diametrical holes located across the inner ends of said bores, the bores having said extensions threaded into them and the said extensions abutting against the median parts of the rods to lock the rods to the bushes.

2. A barrier for anti-tank and similar purposes comprising a metal pole-like core composed of a plurality of metal bushes threaded together in series and a plurality of metal rods affixed between their ends to said bushes and arranged in intesecting directions, said bushes being formed with co-axial threaded bores and externally threaded extensions at their opposed ends and also with diametrical slots across said bores, the bores having the said extensions threaded into them and the said extensions abutting against the median parts of the rods to lock the rods to the bushes.

3. A barrier for anti-tank and similar purposes comprising a flexible core composed of metal links and metal bushes connected together in series, threaded caps and plugs at opposite ends of the links and threaded bores and concentric extensions at opposite ends of the bushes by which the limbs and bushes are fixed together in series, diametrical holes in the bushes and metal rods fixed in said holes by the engagement therewith of the free ends of the said plugs and extensions.

WILLIAM JAMES MAY.